United States Patent Office 3,520,861
Patented July 21, 1970

3,520,861
COPOLYMERS OF ETHYLENE
John E. Thomson and George E. Waples, Jr., Lake Jackson, Tex., assignors to The Dow Chemical Company, Midland, Mich., a corporation of Delaware
No Drawing. Continuation-in-part of application Ser. No. 276,085, Apr. 26, 1963. This application Dec. 26, 1968, Ser. No. 787,236
Int. Cl. C08f 15/02
U.S. Cl. 260—88.1                               10 Claims

ABSTRACT OF THE DISCLOSURE

Homogeneous, compositionally uniform, random copolymers of ethylene and from about 0.1 to about 35 weight percent of acrylic, methacrylic or crotonic acid are made by continuous polymerization in a stirred autoclave under steady state conditions and are particularly characterized by plastic recovery values of less than 100%, usually less than about 50%, controlled by polymerization conditions. Copolymers products are useful in coatings, adhesives and laminations having improved adhesion, printability and glueability relative to polyethylene.

---

This application is a continuation-in-part of applicants' copending application, Ser. No. 276,085 filed Apr. 26, 1963, now abandoned.

This invention pertains to copolymers of ethylene and certain carboxylic acid comonomers.

Solid polyethylene is known and widely used because of its desirable properties, such as ease of fabrication, pleasing appearance, chemical inertness, moisture resistance, etc. However, polyethylene usually has poor adhesive properties and poor printability, and its use for purposes which require such properties is limited.

It is an object of this invention to provide polymers of ethylene having improved properties, particularly as to adhesion. A related object is to provide such polymers of ethylene better suited for adhesive and coating purposes. A further object is to provide such polymers of ethylene which are adapted to form strong bonds to solid substrates coated therewith, which form strong adhesive bonds between laminate layers, and to which printing and other coating materials are strongly adherent. A specific object is to provide copolymers of ethylene and certain carboxylic acid comonomers having such properties. A further object is to provide such polymers having controllable and advantageously low plastic recovery values. Other objects and advantages of this invention will become apparent in the following description.

In one aspect, this invention relates to normally solid, homogeneous, compositionally uniform, random copolymers of ethylene and from about 0.1 to about 35, preferably from about 1 to about 21, especially from about 2 to about 15 percent by weight of acrylic acid, methacrylic acid or crotonic acid.

By "copolymer" is meant that substantially each of the macromolecules of polymer is composed in part of units corresponding to ethylene and in part of units corresponding to the starting carboxylic acid. By "random" is meant that the intra-molecular arrangement of the ethylene and acid units in each macromolecule of copolymer is by statistical chance and fortuitous, any regulating or ordered sequence being accidental and negligible. By "homogeneous" is meant that the copolymer material is discerned as a single physical phase in the solid state. By "compositionally uniform" is meant that substantially all of the copolymer macromolecules have substantially the same chemical composition except, of course, that the length (molecular weight) of the molecules may vary.

In another aspect, this invention relates to such copolymers having plastic recovery values as hereinafter defined of less than 100% and especially including ones having such values less than 50%.

In a specific aspect, this invention relates to such copolymers of ethylene and acrylic acid in the form of a thin sheet consisting essentially thereof and in the form of a layer in a consolidated laminar structure of at least two dissimilar laminar layers.

In still another aspect, this invention relates to means and method for making such copolymers.

The copolymers of this invention are normally solid, i.e. are solid at normal room temperature. They have melt flow rate values, as determined by ASTM procedure D–1238–57T ranging from about 0.01 g./10 minutes when measured by Condition E (at 190° C. using 2160 g. load) to about 20 g./10 minutes when measured by Condition D (at 190° C. using 325 g. load). They also have plastic recovery values of less than 100% and usually less than 50%. The plastic recovery value is determined on the extruded rod which emerges from the orifice of the extrusion plastometer apparatus during the measurement of the melt flow rate by ASTM D–1238–57T. The average diameter of that extruded rod is measured and the plastic recovery value is calculated from the equations:

$$PR\% = \frac{D - D_o}{D_o} \times 100$$

where D is the average diameter of the extruded rod and $D_o$ is the diameter of the orifice of the plastometer (the ASTM standard orifice diameter is 0.0825±0.0002 inch).

The copolymers of this invention are obtained by polymerizing mixtures of ethylene and one or more of the specified acid comonomers at pressure of at least 1000 atmospheres, preferably between 1000 and 3000 atmospheres, e.g. between 1100 and 1900 atomspheres, and at temperature from about 120° to about 300° C., preferably from about 150° C. to about 250° C., in the presence of a free-radial initiator. Under the conditions of polymerization, the acid comonomers are many times more reactive in copolymerizing with ethylene than ethylene is in polymerizing with itself. Thus, it is necessary to use starting monomer feeds and reaction mixtures in which the proportion of acid comonomer to ethylene is smaller than is desired in the copolymer product according to the respective reactivities of the monomers. Such starting feed ratios, for example, are usually from about 10 to about 10,000 parts of ethylene per part of the acid comonomer, by weight. It is also essential to maintain a supply of each of the monomers in the reaction mixture during the course of the polymerization. In order to get substantially homogeneous copolymers, the polymerization is carried out in a reaction mixture which is maintained in a manner such that the polymerization conditions are substantially constant throughout the reaction mixture and throughout the time of the run. That is, the temperature and pressure and the concentration of monomers, of copolymer product and catalysts and other modifiers of the polymerization are all held constant in the reaction mixture which is stirred or otherwise mixed to insure substantially uniform composition throughout. The polymerization is carried out to obtain conversion of ethylene to polymer at a practically constant level in the range of from about 2 to about 30 percent, usually from 3 to 20 percent, preferably 5 to 20 percent. The conversion of the acid comonomer is generally higher and is usually at a practically constant level in the order of 50–60 percent but may be higher than 60 percent even approaching (but not reaching) 100 percent depending on the kind and concentration of acid. It is possible to approximate these uniform conditions in a special modification of a batch process in which the reactants are fed as needed to a reaction mixture which is allowed to accumulate, e.g. in a reaction kettle. However, it is more convenient and effective to carry out the polymerization in a stirred autoclave reactor in a continuous manner, i.e. continuously feeding the starting materials to the well-stirred reaction mixture in the autoclave and continuously withdrawing the reaction mixture from the autoclave at corresponding rates to maintain the system in balance. By feeding the starting materials or mixture thereof in a manner such that the ratio of constituents, including monomers, is maintained on the basis of the reactivity ratios and by maintaining reaction conditions and contact time in the stirred autoclave reactor adjusted to the requirements of the reaction desired, compositionally uniform, homogeneous, random copolymers are obtained in accordance with this invention. Such products, and the results obtained therefrom, are entirely different, because of their uniform, homogeneous, random molecular structure and distribution of acid groups, from non-uniform, non-homogeneous products which contain substantial amounts of homopolymers of the ethylenically unsaturated acid and/or of homopolyethylene, e.g., polymer mixtures made in batch or tubular reactors. In this connection, by "batch" process is meant one in which all of the reactants are charged at once to the reactor at the start of the reaction, and none of the reaction mixture or product is withdrawn during the reaction period or a substantial part of it. In such process, the ratio of unreacted monomers to each other, and the ratio of the several monomers entering the polymer changes as the polymerization proceeds and the faster acting monomer is consumed. Thus, the first-formed copolymer is rich in the faster polymerizing comonomer, the last-formed copolymer is rich in the slower polymerizing comonomer, the system may become exhausted as to the fast polymerizing comonomer and homopolymer of the remaining monomer may form, and the resulting product is a heterogeneous mixture of non-uniform polymers of the starting monomers. By "tubular reactor" or process is meant one in which the starting materials are fed into or near one end of an elongated tube or vessel which has great length relative to cross section and relatively small diameter and through which the reaction mixture flows with no end-to-end mixing to an outlet remote from the feed inlet. Although the tubular reactions are usually run continuously, the reaction mixture changes incrementally along the length of the reactor from inlet to outlet in ways similar to the changes in the batch reaction mixture and with similar results in that the polymer product is a heterogeneous mixture or non-uniform polymers of the starting monomers. In contrast thereto, by continuous operation of the copolymerization process in a stirred autoclave, after being "lined out," i.e. brought to a steady state of operation under a selected set of conditions, all of the copolymer is formed from the same and constant ratio of monomeric comonomers, and the resulting polymer product is a substantially homogeneous, uniform copolymer of the starting comonomers. By "continuous" is meant that the starting materials are fed to the sirred autoclave and the reaction mixture therein is withdrawn from the autoclave at equivalent rates throughout the course of the run, whatever its duration. The "continuous" feeding to and withdrawing from the autoclave can be at substantially constant and uniform flow rates or can be fluctuating or intermittent flows where there are frequent interruptions of short duration provided that the overall effect is to maintain the composition of the reaction mixture in the reaction zone substantially constant during the run.

The polymerization of the monomers is initiated and promoted by a free radical generating, ethylene polymerizing initiator or catalyst such as oxygen, peroxygen compounds, and azo compounds, specific examples being hydrogen peroxide, diethyl peroxide, persuccinic acid, lauroyl peroxide, di-tert.-butyl peroxide, cumene hydroperoxide, dicumyl peroxide, tetrahydronaphthalene peroxide, benzoyl peroxide, urea peroxide, t-butyl peracetate, azo-$\alpha,\alpha'$-bis-isobutyronitrile and the like. As in the art of polymerizing ethylene alone, only small, catalytic quantities of catalysts are used, usually in the order from about 0.001 percent to about 0.05 percent by weight based on the feed. The reaction mixture must be homogeneous, and may contain mutually compatible solvents such as isooctane, cyclohexane, benzene, toluene, chlorobenzene, tert.-butyl alcohol, etc., some of which are used as media for introducing the acid comonomer and/or the catalyst, and some of which solvents act as chain transfer agents in the polymerization. The starting ethylene can also contain small amounts of saturated materials such as methane, ethane, propane, butane, etc. which are true telogens and/or olefins such as propylene, butene, etc., all of which copolymerize to a minor extent and also terminate growing polymer chains.

A general description of one mode of operation to produce the copolymers of this invention follows:

Ethylene under pressure is passed into a steam-heated autoclave polymerizer having a stirrer turning at 1200 r.p.m. and capable of thoroughly intermixing the contents of the autoclave. Selected ethylenically unsaturated carboxylic acid comonomer and catalyst are also injected into the autoclave, these being dissolved in a suitable solvent-diluent, if desired. Chain regulator, telogen, or the like can also be fed into the reactor. The pressure is built up by restricting the discharge from the autoclave until the desired operating pressure is reached, whereupon the reaction mixture is withdrawn from the autoclave at a rate which maintains the desired operating pressure. The temperature is allowed to rise by heat of compression and heat transfer from reactor to monomer until polymerization is initiated by catalyst injection and is thereafter controlled at the level desired. Catalyst injection is begun as the increasing pressure reaches 8000 p.s.i. After equilibrium of these operations is established, samples of the effluent reaction mixture are analyzed and adjustments are made in pressure, temperature, feed rates, ratio of acidic comonomer to ethylene in the feed, rate of feed of catalyst, chain regulator, etc., to obtain the desired copolymer product. The reaction mixture is conventionally passed from the autoclave into a pressure let-down vessel where unreacted ethylene and readily volatile constituents, including unreacted acid comonomer, are flashed off at a substantially lower pressure than that of the autoclave while maintaining temperature above the copolymer melting point. The molten polymer is then usually further devolatilized and extruded, cooled and chopped into granules suitable for molding, extrusion, or other use.

As hereinbefore indicated, one aspect of this invention is method and means for controlling the plastic recovery value (as herein defined) of the copolymer product and to make copolymer products having plastic recovery values below 100% and especially below 50%. In general, everything else being the same, the plastic recovery value of a copolymer made in a particular reactor is increased by increasing the temperature and/or the pressure in the reaction zone, the temperature effect being more noticeable and greater at higher pressures and the pressure effect being more noticeable and greater at higher temperatures. The reactor design and geometry is also important in that, in general, the more thorough the mixing of the reaction mixture throughout the reaction zone the lower the plastic recovery value of the resulting copolymer product. Accordingly, by changing the kind and number of mixing elements on the stirrer and the speed thereof and the kind and distribution of any baffles in the reactor one can affect the plastic recovery value of the copolymer product.

The copolymers of this invention combine the useful properties of polyethylene with new properties attributable to the presence of acidic moieties in the homogeneous copolymers. Thus, these copolymer products are thermoplastic solids, colorless or nearly so and translucent to transparent ranging from soft waxy materials to hard stiff products. Being thermoplastic and melting in the range from 80° to about 120° C., these products are readily molded in conventional polyethylene equipment by compression, injection, extrusion, etc. They are corrosion resistant, solvent and moisture resistant, impermeable, tough and rigid. Unlike homopolyethylene which is poor in qualities of adhesion, printability, and glueability, the present copolymers are surprisingly adhesive, glueable, and printable. These copolymers are particularly useful as adhesives, e.g. in the preparation of laminates of and coatings on various substrates including metals, glass, plastics, paper, wood and other cellulosics, especially in coated paper products and wrapping materials, and as bases for direct printing as of labels or coating for decorative or other purpose.

The following examples illustrate the invention but are not to be taken as limiting its scope. In the examples, parts and percentages are by weight unless otherwise indicated.

EXAMPLE I

Ethylene and acrylic acid were copolymerized in a series of runs identified and further described in Table I. The runs were carried out in a continuous manner in a 50-liter pressure autoclave having a central agitator shaft carrying several sets of pitched paddle blades and turning at 1200 r.p.m., thoroughly admixing the reaction mixture in the autoclave. The feed comprised fresh ethylene, fresh acrylic acid, a recycled mixture of ethylene and acrylic acid from the polymer separation step, and catalyst which was a solution of 21 weight percent lauroyl peroxide dissolved in a mixture of 80 parts benzene and 20 parts hexane, by weight. The reaction product was released from the autoclave to a pressure let-down vessel from which the copolymer product was extruded and collected; a vapor mixture comprising unreacted ethylene and acrylic acid from the let-down vessel was repressurized and recycled back to the polymerization autoclave as indicated, fresh ethylene being added as necessary to maintain the pressure and other operating conditions and to replace the ethylene removed as copolymer product. In Table I, the "ethylene flow" is the total rate of feeding the recycled ethylene (also containing unreacted acrylic acid) and the make-up fresh ethylene to the autoclave. The "Acrylic Acid Feed" refers to the rate of feeding fresh acrylic acid to the autoclave and does not include the unreacted acrylic acid in the recycled ethylene. To the fresh ethylene used in Runs 1–18 was added propylene in varying amounts up to about 1% as a telogen to assist in controlling the molecular weight (reflected in the melt flow rate) of the polymer product. The table also shows the rate of feeding the catalyst solution in gallons per hour, the rate of production of copolymer in pounds per hour, and the acrylic acid content of the resulting copolymer product in percent by weight. Runs 1–18 were made at temperature 170° C. and pressure 24,500 p.s.i.g.; run 19 was at 224° C. and 25,500 p.s.i.g.

Table I also shows properties of the resulting polymer products.

Melt Flow rate is measured by ASTM D–1238–57T (Condition E) in dg./min.

Tensile and yield strength in p.s.i. and elongation in percent of original length at break are measured by ASTM D–638–58T on specimens cut using die "B" of ASTM D–412–51T pulled at 10 inches per minute.

Brittle point in ° C. is by ASTM D–476–52T.

Stress crack in hours is by the Bell Telephone method.

Rigidity is by ASTM D–747–58T.

Hardness is by Shore "C" method.

Density is measured by Archimedes' displacement-buoyancy principle.

Melt Strength is the force in grams required to draw a polymer strand from the extrusion plastometer (ASTM D–1238–57T) at a linear speed of 20 feet per minute. The average break speed is the rate of draw in feet per minute at which the strand breaks.

The Dart Impact Strength is the weight in grams of a plummet which on free fall of 26.5 inches to the center of a five-inch diameter circle of approximately 1.5-mil film specimen supported on its circumference breaks 50 percent of the samples.

Adhesion in pounds per inch width is measured by ASTM D–429–58.

Plastic Recovery is determined during measurement of Melt Flow rate by ASTM D–1238–57T as percentage increase of extrudate diameter over the diameter of the plastometer orifice.

"ND" in the table signifies that the value was not determined.

In Table I, Run No. 1 is a control, without acrylic acid, for comparison, and is not an example of the copolymers of this invention.

TABLE I

| | Run No. | | | | | | | | | |
|---|---|---|---|---|---|---|---|---|---|---|
| | 1* | 2 | 3 | 4 | 5 | 6 | 7 | 8 | 9 | 10 |
| Ethylene flow, lbs./hr | 640 | 640 | 640 | 640 | 640 | 640 | 640 | 640 | 640 | 640 |
| Acrylic acid feed, lbs./hr | 0 | 2 | 4 | 5.3 | 7.5 | 10.6 | 14.1 | 17.4 | 17.4 | 17.4 |
| Catalyst, gals./hr | 5/16 | 3/8 | 3/8 | 1/4 | 7/16 | 1/2 | 1/2 | 5/8 | 5/8 | 3/4 |
| Polymer product, lbs./hr | 61 | 50 | 50 | 55 | 57 | 53 | 52 | 60 | 60 | 60 |
| Acrylic acid in copolymer | 0 | 3.7 | 8.7 | 11.8 | 15.9 | 22.6 | 27.2 | 28.7 | 31.6 | 30.0 |
| Melt flow rate, dg./min | 2.15 | 2.30 | 2.69 | 2.36 | 2.78 | 2.83 | 3.03 | 2.80 | 1.46 | 5.68 |
| Tensile strength, p.s.i | 1,575 | 2,315 | 2,835 | 3,815 | 4,150 | 4,250 | 3,960 | 3,300 | 3,320 | 3,070 |
| Yield strength, p.s.i | 1,800 | 1,615 | 1,685 | 1,830 | 1,440 | 1,765 | 2,295 | 2,200 | 2,550 | 2,140 |
| Elongation, percent | 530 | 580 | 500 | 545 | 510 | 465 | 405 | 355 | 310 | 335 |
| Brittle point, ° C | <−70 | <−70 | <−70 | <−70 | <−70 | <−70 | −67 | −28 | ND | ND |
| Stress crack, hours | 1 | 1¾ | >48 | >48 | >48 | >48 | >48 | >48 | ND | ND |
| Rigidity, p.s.i.×10⁻⁴ | 3.0 | 2.4 | 1.7 | 1.5 | 1.2 | 1.6 | 2.0 | 2.1 | 3.1 | 1.9 |
| Hardness | 85 | 85 | 85 | 85 | 85 | 90 | 93 | 93 | 95 | 93 |
| Density, g./cc | .9218 | .9253 | .9325 | .9381 | .9456 | .9614 | .9750 | .9781 | .9881 | .9803 |
| Melt strength, g | 3.7 | 3.5 | 3.1 | 2.4 | 3.5 | 3.4 | 4.3 | 5.3 | 5.1 | 4.5 |
| Break speed, f.p.m | 133 | 172 | 194 | >285 | >289 | 226 | 154 | 29 | 15.3 | 144 |
| Dart impact, g | 70 | 245 | 682 | 700 | 580 | 485 | 415 | 460 | 242 | 400 |
| Adhesion to iron | 0 | 1.39 | 13.0 | 14.4 | 16.9 | 19.3 | 13.2 | 12.4 | 9.95 | 12.5 |
| Adhesion to aluminum | 0 | 3.83 | 24.8 | 36.0 | 34.5 | 41.5 | 36.7 | 19.3 | 17.8 | 23.7 |
| Plastic recovery, percent | 40.6 | 41.8 | 45.5 | 35.8 | 33.3 | 27.3 | 33.3 | 39.4 | 27.3 | 40.6 |

See footnote at end of table.

TABLE I—Continued

| | Run No. | | | | | | | | |
|---|---|---|---|---|---|---|---|---|---|
| | 11 | 12 | 13 | 14 | 15 | 16 | 17 | 18 | 19 |
| Ethylene flow, lbs./hr | 640 | 640 | 640 | 640 | 640 | 640 | 640 | 640 | 490 |
| Acrylic acid feed, lbs./hr | 17.4 | 17.4 | 17.4 | 7.5 | 5.3 | 6 | 6 | 6 | 7.5 |
| Catalyst, gals./hr | 3/4 | 5/8 | 3/4 | 3/8 | 5/16 | 3/8 | 1/2 | 3/8 | 1 |
| Polymer product, lbs./hr | 60 | 60 | 60 | 61 | 53 | 50 | 50 | 50 | 60 |
| Acrylic acid in copolymer | 28.0 | 26.9 | 27.1 | 15.8 | 12.5 | 13.3 | 14.2 | 13.4 | 12.3 |
| Melt flow rate, dg./min | ND | 14.2 | 30.4 | 1.24 | 5.49 | 10.9 | 18.0 | 16.2 | 3.72 |
| Tensile strength, p.s.i | 2,680 | 2,785 | 2,565 | 4,430 | 3,660 | 3,385 | 3,145 | 3,300 | 3,220 |
| Yield strength, p.s.i | 1,640 | 1,910 | 1,830 | 1,590 | 1,835 | 1,365 | 1,365 | 1,405 | 1,275 |
| Elongation, percent | 350 | 345 | 335 | 520 | 555 | 540 | 520 | 560 | 515 |
| Brittle point, ° C | ND | ND | ND | ND | ND | ND | ND | ND | ND |
| Stress crack, hours | ND | ND | ND | ND | ND | ND | ND | ND | ND |
| Rigidity, p.s.i.$\times 10^{-4}$ | 1.2 | 1.4 | 1.0 | 1.3 | 1.4 | 1.3 | 1.1 | 1.5 | 1.2 |
| Hardness | 90 | 90 | 90 | 85 | 85 | 85 | 85 | 85 | 80 |
| Density, g./cc | .9744 | .9726 | .9728 | .9457 | .9389 | .9404 | .9414 | .9400 | .9379 |
| Melt strength, g | 5.2 | 5.6 | 4.1 | 5.6 | 1.1 | 4.3 | 3.3 | 3.8 | 5.6 |
| Break speed, f.p.m | 85 | 39.8 | 190 | 154 | >294 | 97.4 | 200 | 195 | 107 |
| Dart impact, g | 370 | 275 | 255 | 610 | 605 | 622 | 438 | 485 | 462 |
| Adhesion to iron | 28.2 | 14.4 | 18.2 | 22.0 | 16.8 | 10.7 | 12.9 | 16.2 | 19.3 |
| Adhesion to aluminum | 15.4 | 58 | 47.8 | 46.4 | 44.7 | 46.3 | 41.4 | 54.7 | 41.5 |
| Plastic recovery, percent | 40.6 | 46.7 | 43.0 | 30.9 | 33.3 | 35.8 | 47.9 | 35.8 | 61.2 |

*Not an example of the invention.

EXAMPLE II

Copolymers of ethylene and acrylic acid made in accordance with the procedure of Example 1 were fabricated into thin sheets and tested for printability and glueability.

Printability was evaluated by applying markings of standard printing inks (e.g., a gravure ink such as "IPI Red Gravure" and a flexographic ink such as "Flexotuf") to a surface of the plastic film by means of a hand proofer. After allowing the ink to dry for 15 minutes, pressure sensitive cellophane tape was pressed against the printed area and then pulled away. No difference was observed in the samples tested whether the pull away was slow or fast. A rating of "poor" indicates that nearly all of the ink adhered to the tape and was removed from the ethylene polymer surface; a rating of "excellent" means that practically none of the ink was removed from the printed polymer surface.

Glueability was evaluated by applying a bead line of glue to the plastic sheet and placing a sheet of unsized 40-pound kraft paper against it with the glue line between the plastic sheet and the paper. After drying overnight, the sheets were pulled apart. A rating of "poor" indicates that separation occurred between the plastic sheet and the glue, meaning that the bond between plastic and glue was relatively poor. A rating of "excellent" indicates that separation occurred by tearing of the paper fibers, meaning that the bond between plastic and glue was relatively good and strong. Identical results were obtained using a starch-base glue and a casein-based glue.

Table II shows the results of several tests. Test A is one in which homopolyethylene is used for control and comparison and is not a test of a copolymer of this invention. Tests B–E are tests of the compositionally uniform, homogeneous copolymers within the perview of this invention.

TABLE II

| Test No. | Acrylic acid in copolymer | Melt flow (Condition E) dg./min. | Printability | Glueability |
|---|---|---|---|---|
| A | 0 | 2.15 | Poor | Poor. |
| B | 4.1 | 2.3 | Excellent | Excellent. |
| C | 8.7 | 2.38 | do | Do. |
| D | 10.0 | 21.5 | do | Not determined. |
| E | 11.6 | 2.69 | do | Do. |

The homogeneous, compositionally uniform, random copolymers of this invention are particularly adapted for preparation of strongly bonded coated materials by melt extrusion coating of substrates with such copolymers. For instance in the melt extrusion coating of substrate webs such as paper by the process described in U.K. specifications 688,637 and 701,553, advantageous results are obtained using the present copolymers in place of polyethylene. The coating process can be run more rapidly and/or at relatively lower temperature, and the extruded copolymer melt has the ability to drawdown to thinner coatings. Moreover, the adhesion of the copolymer coating to the substrate is considerably improved. For example, coatings were made on 40-pound kraft paper at extrusion temperature of 600° F. and haul-off rate of 180 feet per minute. Comparison was made between a conventional polyethylene having density 0.917 g./cc. and Melt Index 5 and a homogeneous, compositionally uniform random copolymer of this invention of approximately 97.4 weight percent ethylene and approximately 2.6 weight percent acrylic acid having density 0.9238 g./cc. and Melt Flow (Condition E) of 8.7 dg./min. The resulting coatings (thickness 0.4 and 0.5 mil, respectively) were tested for adhesion by the Perkins-Southwick adhesion test. The adhesion of the polyethylene coating was 9 lbs./in.$^2$. In contrast, the adhesion of the new copolymer was 28 lbs./in.$^2$. At haul-off rate of 300 ft./min., the adhesion of the polyethylene coating (0.2 mil thick) had fallen off to 3 lbs./in.$^2$, whereas the adhesion of the new copolymer coating (0.3 mil thick) was 9 lbs./in.$^2$, i.e. as good at the higher speed as polyethylene at the lower speed.

The adhesion of the coating materials just described was also tested on various other kinds of substrates. The extrusion coatings were applied at 575° F. and thickness of approximately one mil to webs of poly(ethylene terephthalate), uncoated cellophane, and to the coated side of cellophane having a 2-mil saran coating. The peel strengths were determined (Instron tester, operated at 10 inches per minute on samples one inch wide, reported in grams/inch widths) as follows:

| | Peel strength, g./in. | |
|---|---|---|
| Substrate | Polyethylene | Ethyleneacrylic acid copolyme |
| Poly(ethylene terephthalate) | 9 | 20 |
| Cellophane, uncoated | 5 | 85 |
| Cellophane, saran coated | 25 | 45 |

EXAMPLES III–XII

By the procedure for continuous copolymerization under steady state conditions described in Example I, except that a two-liter stirred autoclave was used, ethylene was copolymerized with methacrylic acid, crotonic acid and acrylic acid. The monomers and a catalyst composition were fed continuously to the stirred autoclave in proportions to make the desired copolymer, and the reaction mixture in the autoclave was maintained at polymerization temperature and pressure indicated below. From the reaction mixture continuously withdrawn from the autoclave was recovered the resulting copolymer products whose properties are set out in Table III.

In Examples III and IV ethylene was continuously copolymerized with methacrylic acid (dissolved in acetone) at 200° C. and 21,000 p.s.i.g. using a mixture of lauroyl peroxide and benzoyl peroxide as a catalyst to make copolymers of about 12% acid.

polymer products is estimated from infra-red analyses and from graphs based on the mechanical properties and density of the products.

TABLE III

| Example | Acid comonomer | Acid in copolymer | Melt flow (E) dg./min. | Plastic recovery, percent | Tensile strength p.s.i. | Yield strength | Elongation, percent | Rigidity ×10⁻⁴ p.s.i. | Hardness | Density g./cc. |
|---|---|---|---|---|---|---|---|---|---|---|
| III | Methacrylic | 12 | 0.42 | 52 | 3,060 | 1,525 | 575 | 1.5 | 85 | 0.9408 |
| IV | do | 12 | 19.4 | ND | 1,590 | 1,580 | 125 | 1.6 | 85 | 0.9427 |
| V | Crotonic | 3 | 48 | ND | 1,370 | 1,790 | 115 | 2.4 | 85 | 0.9311 |
| VI | do | 2 | 0.05 | 31 | 2,455 | 1,645 | 545 | 2.3 | 85 | 0.9261 |
| VII | do | 3 | 7.98 | 45.5 | 1,395 | 1,745 | 165 | 2.2 | 85 | 0.9277 |
| VIII | Acrylic | 5 | 190 | ND | 1,140 | 1,275 | 165 | 1.4 | 80 | 0.9275 |
| IX | do | 4 | 2.05 | 73 | 1,360 | 1,460 | 245 | 1.4 | 80 | 0.9234 |
| X | do | 35 | 12.2 | 43 | 2,350 | 2,640 | 190 | 3.0 | 90 | 0.9990 |
| XI | do | 9 | 5.67 | 84 | 2,425 | 1,490 | 565 | 1.3 | 80 | 0.9350 |
| XII | do | 16 | 33 | ND | 2,045 | 1,620 | 465 | 1.4 | 80 | 0.9451 |

ND—Not determined.

In Examples V–VIII, ethylene was continuously copolymerized with crotonic acid (dissolved in acetone) at 203° C. and 21,000 p.s.i.g. using lauroyl peroxide and benzoyl peroxide as catalysts to make copolymers of about 2–3% acid.

In Example VIII, ethylene was continuously copolymerized with acrylic acid (dissolved in a mixture of hexane and benzene) at temperature about 200° C. and pressure of 16,000 p.s.i.g. in the presence of tertiary-butyl peracetate as catalyst to make a copolymer of about 5% acid.

In Example IX, ethylene was continuously copolymerized with acrylic acid at 220° C. and 21,000 p.s.i.g. in the presence of tertiary-butyl peracetate as catalyst to make a copolymer of about 4% acid.

In Example X, ethylene was continuously copolymerized with acrylic acid at 185° C. and 21,000 p.s.i.g. in the presence of lauroyl peroxide catalyst to make a copolymer of about 35% acid.

In Example XI, ethylene was continuously copolymerized with acrylic acid (dissolved in acetone) at 200° C. and 21,000 p.s.i.g. in the presence of lauroyl peroxide and benzoyl peroxide catalysts to make a copolymer of about 9% acrylic acid.

The copolymer products of Examples III–XII were homogeneous, random copolymers of ethylene and the indicated acid comonomer and were all characterized by superior adhesion, printability and glueability.

EXAMPLE XIII

A series of runs was made to show the effect of temperature and pressure during copolymerization of ethylene and acrylic acid on the plastic recovery value of the resulting copolymer products and the control thereof by these means. In this series, ethylene and acrylic acid were continuously copolymerized by the procedure for continuous copolymerization under steady state conditions described in Example I, using lauroyl peroxide as the catalyst. In each run, conditions of feed were adjusted to make a copolymer product having about 8 to 9% acrylic acid, and having a melt flow rate (Condition E) of about 5, using a controlled amount of propylene as telogen where necessary to obtain the desired melt flow rate value. The runs were varied as to temperature in steps of 10° from 180° C. to 210° C. and as to pressure in steps of 1000 p.s.i. from 16,500 p.s.i.g. to 21,500 p.s.i.g. The properties of 15 copolymer products so obtained are shown in Table IV and the plastic recovery values are shown as functions of temperature and pressure in Table V.

TABLE IV

| | Run No. | | | | | | | | | | | | | | |
|---|---|---|---|---|---|---|---|---|---|---|---|---|---|---|---|
| | C | D | E | F | G | H | I | J | K | L | M | N | O | P | Q |
| Temp. ° C. | 180 | 180 | 180 | 180 | 190 | 190 | 190 | 190 | 200 | 200 | 200 | 200 | 210 | 210 | 210 |
| Pressure, p.s.i.g.×10⁻³ | 16.5 | 17.5 | 18.5 | 19.5 | 17.5 | 18.5 | 19.5 | 20.5 | 18.5 | 19.5 | 20.5 | 21.5 | 18.5 | 19.5 | 20.5 |
| Melt flow ¹ | 4.97 | 4.57 | 4.71 | 4.53 | 4.72 | 4.29 | 4.49 | 4.71 | 4.33 | 4.68 | 4.63 | 5.46 | 4.84 | 5.03 | 5.19 |
| Plastic recovery, percent | 33 | 39 | 33 | 41 | 24 | 37 | 39 | 39 | 48 | 53 | 61 | 85 | 59 | 90 | 94 |
| Tensile, p.s.i. | 3,610 | 3,715 | 3,780 | 3,555 | 3,670 | 3,425 | 3,185 | 3,510 | 3,270 | 3,360 | 3,280 | 3,055 | 2,995 | 2,900 | 3,230 |
| Yield, p.s.i. | 1,525 | 1,510 | 1,485 | 1,480 | 1,435 | 1,455 | 1,440 | 1,470 | 1,430 | 1,415 | 1,350 | 1,345 | 1,290 | 1,300 | 1,350 |
| Elongation, percent | 580 | 575 | 595 | 605 | 600 | 605 | 540 | 585 | 605 | 595 | 560 | 545 | 585 | 570 | 560 |
| Rigidity, p.s.i.×10⁻⁴ | 1.6 | 1.6 | 1.6 | 1.6 | 1.6 | 1.6 | 1.6 | 1.5 | 1.6 | 1.5 | 1.4 | 1.5 | 1.4 | 1.4 | 1.3 |
| Hardness | 85 | 85 | 85 | 85 | 85 | 85 | 85 | 85 | 85 | 85 | 85 | 85 | 80 | 80 | 85 |
| Density gm./cc. | .9355 | .9370 | .9363 | .9350 | .9341 | .9332 | .9348 | .9359 | .9327 | .9341 | .9340 | .9345 | .9314 | .9323 | .9348 |
| Melt strength, g. | 0.9 | 1.0 | 1.0 | 1.1 | 0.6 | 1.5 | 1.5 | 1.4 | 2.0 | 2.6 | 3.0 | 5.9 | 2.9 | 7.5 | 6.0 |
| Percent acrylic acid | 9.2 | 9.8 | 9.3 | 8.9 | 8.8 | 8.2 | 8.6 | 9.5 | 8.2 | 8.5 | 9.0 | 8.9 | 7.1 | 7.7 | 8.6 |

¹ ASTM D-1238-57T Condition E, dg./min.

In Example XII, ethylene was continuously copolymerized with acrylic acid (dissolved in acetone) at 200° C. and 21,000 p.s.i.g. in the presence of lauroyl peroxide and benzoyl peroxide catalyst to make a copolymer of about 16% acrylic acid.

The properties of the resulting copolymer products are set out in Table III, these properties being measured by standard methods hereinbefore described. The amount of acid comonomers copolymerically combined in the co-

TABLE V

| | Temperature | | | |
|---|---|---|---|---|
| | 180° C. | 190° C. | 200° C. | 210°C. |
| Pressure, p.s.i.g.: | | | | |
| 16,500 | ¹ 33% | | | |
| 17,500 | 39% | 24% | | |
| 18,500 | 33% | 37% | 48% | 59% |
| 19,500 | 41% | 39% | 53% | 90% |
| 20,500 | | 39% | 61% | 94% |
| 21,500 | | | 85% | |

¹ Plastic Recovery Values from Table IV.

For purpose of contrast with the examples of this invention, tests were made on samples of ethylene/acrylic acid copolymer products which were known to be heterogeneous and non-uniform in composition.

Sample 1 contained about 20% homopolyethylene and copolymers ranging up to about 17% acrylic acid, the statistical average being about 9.4% acrylic acid.

Sample 2 contained about 25% homopolyethylene and copolymers ranging up to about 30% acrylic acid, the statistical average being about 9.5% acrylic acid.

Sample 3 contained about 35% homopolyethylene and copolymers ranging up to about 30% acrylic acid, the statistical average being about 8.2% acrylic acid.

Sample 4 contained about 8% homopolyethylene and copolymers ranging up to about 17% acrylic acid, the statistical average being about 9.7% acrylic acid.

The properties of these products are shown in Table VI, wherein it will be noted that the plastic recovery values are all substantially above 100%.

TABLE VI

| | Sample | | | |
|---|---|---|---|---|
| | 1 | 2 | 3 | 4 |
| Melt Flow (E) dg./min. | 6.9 | 6.5 | 7.5 | 7.3 |
| Tensile, p.s.i. | 2,460 | 2,390 | 2,004 | 2,697 |
| Yield, p.s.i. | 1,339 | 1,355 | 1,386 | 1,265 |
| Elongation, percent | 516 | 510 | 465 | 540 |
| Rigidity, p.s.i.×10⁻⁴ | 1.49 | 1.57 | 1.72 | 1.20 |
| Density, g./cc. | .9330 | .9320 | .9308 | .9339 |
| Plastic recovery, percent | 136 | 130 | 155 | 136 |

As indicated hereinbefore, the copolymers of this invention are useful as molding resins and as coating resins and adhesives. They are used in the coating of paper, paperboards, metals such as iron and aluminum, plastics, and other kinds of solid materials toward which they show particularly good adhesion. They are further useful in laminating as the agent to effect bonding together of layers, sheets, foils, etc. of the same or different material such as the aforementioned paper, metal, plastics, etc. They are also useful in forming a surface which can be printed on without further treatment and to which glued entities such as labels can be securely affixed.

What is claimed is:

1. A homogeneous, compositionally uniform, random copolymer of ethylene and from about 0.1 to about 35 percent by weight based on the copolymer of an $\alpha,\beta$-ethylenically unsaturated carboxylic acid selected from the group consisting of acrylic acid, methacrylic acid and crotonic acid, which copolymer has a standard melt flow rate value by ASTM D-1238-57T in the range from about 0.01 gram per ten minutes at Condition E to about 20 grams per ten minutes at Condition D and has a plastic recovery value of less than 100%.

2. A copolymer according to claim 1 wherein the acid entity is from about 1 to about 12 percent by weight of the copolymer.

3. A copolymer according to claim 1 wherein the acid entity is acrylic acid.

4. A copolymer according to claim 3 which has a standard melt flow rate value by ASTM D-1238-57T Condition E in the range from about 1 to about 30 grams per ten minutes and has a plastic recovery value of less than 50%.

5. A copolymer according to claim 3 in the form of a thin sheet consisting essentially thereof.

6. A copolymer according to claim 3 in the form of a layer in a consolidated laminar structure of at least two dissimilar laminar layers.

7. Process of making homogeneous, compositionally uniform, random copolymers of ethylene and an acid comonomer as hereinafter defined, said copolymers containing from about 0.1 to about 35 percent by weight based on the copolymer of the said acid and having a standard melt flow value by ASTM D-1238-57T of from about 0.01 gram per ten minutes at Condition E to about 20 grams per ten minutes at Condition D and having a plastic recovery value of less than 100% by continuously feeding, to a homogeneous reaction mixture in a reaction zone maintained in a steady state at a pressure from 1000 to 3000 atmospheres and a temperature in the range from about 120° to about 300° C., feed materials comprising ethylene, a free radical initiator, and an acid comonomer selected from the group consisting of acrylic acid, methacrylic acid and crotonic acid, said acid comonomer being fed in a ratio of one part thereof to an amount of ethylene in the range from about 10 to about 10,000 parts by weight, copolymerizing ethylene and the acid comonomer in the reaction mixture while thoroughly admixing the reaction mixture in the reaction zone and maintaining therein the concentrations of ethylene, acid comonomer and resulting copolymer product substantially constant and polymerizing only part of the ethylene and acid comonomer present in the reaction zone, and continuously withdrawing an amount of the whole resulting reaction mixture containing unreacted ethylene, unreacted acid comonomer, and the resulting copolymer product from the reaction zone at a rate equivalent to the rate of feeding the feed materials to the reaction zone.

8. Process according to claim 7 wherein the acid comonomer is acrylic acid.

9. Process according to claim 7 wherein the portion of reaction mixture withdrawn from the reaction zone is continuously separated into a fraction of copolymer product and a fraction of unreacted ethylene and unreacted acid comonomer and the latter fraction of unreacted ethylene and reacted acid comonomer is continuously recycled to the reaction zone as part of the feed materials fed to the reaction zone.

10. Process according to claim 7 wherein the conditions of temperature and pressure in the reaction zone are maintained such that the temperature is in the range from about 150° to about 250° C. and the pressure is in the range from about 1000 atmospheres to about 3000 atmospheres and at least one of the said conditions of temperature and pressure is controlled at a lower value in the respective range whereby a copolymer having a plastic recovery value below 50% is obtained.

References Cited

UNITED STATES PATENTS

| 2,395,381 | 2/1946 | Squires | 260—88.1 |
| 3,132,120 | 5/1964 | Graham | 260—78.5 |
| 2,953,551 | 9/1960 | White | 260—86.7 |
| 3,198,776 | 8/1965 | Miller et al. | 260—86.7 |
| 3,436,363 | 4/1969 | Helin | 260—29.6 |
| 3,437,626 | 4/1969 | Glabisch | 260—29.6 |

FOREIGN PATENTS

| 655,298 | 1/1963 | Canada. |
| 269,340 | 10/1961 | Spain. |
| 1,295,924 | 5/1962 | France. |

JOSEPH L. SCHOFER, Primary Examiner

J. C. HAIGHT, Assistant Examiner

U.S. Cl. X.R.

117—124, 132, 138.8, 145, 148, 155, 161; 156—326, 327; 161—216, 249, 250, 252; 260—80.3

Notice of Adverse Decision in Interference

In Interference No. 99,752, involving Patent No. 3,520,861, J. E. Thomson and G. E. Waples, Jr., COPLYMERS OF ETHYLENE, final judgment adverse to the patentees was rendered September 19, 1980, as to claims 1-8 & 10.
[*Official Gazette February 23, 1982.*]

Disclaimer 3,520,861.—*John E. Thomson*, and *George E. Waples, Jr.*, Lake Jackson, Tex. COPOLYMERS OF ETHYLENE. Patent dated July 21, 1970. Disclaimer filed Jan. 31, 1983, by the assignee, *The Dow Chemical Co.*

Hereby enters this disclaimer to claims 1 through 8 and 10 of said patent.

[*Official Gazette April 19, 1983.*]